US010550954B2

(12) United States Patent
Duer et al.

(10) Patent No.: US 10,550,954 B2
(45) Date of Patent: Feb. 4, 2020

(54) ELASTOMERIC IN-LINE TIDE GATE VALVE

(71) Applicant: Red Valve Company, Inc., Carnegie, PA (US)

(72) Inventors: Michael J. Duer, Zelienople, PA (US); Chris Raftis, Upper St. Clair, PA (US); Andre Thomas Abromaitis, Painesville, OH (US)

(73) Assignee: Red Valve Company, Inc., Pittsburgh, PA (US)

( * ) Notice: Subject to any disclaimer, the term of this patent is extended or adjusted under 35 U.S.C. 154(b) by 0 days.

(21) Appl. No.: 15/656,412

(22) Filed: Jul. 21, 2017

(65) Prior Publication Data

US 2018/0023724 A1    Jan. 25, 2018

Related U.S. Application Data

(60) Provisional application No. 62/364,980, filed on Jul. 21, 2016.

(51) Int. Cl.
| | | |
|---|---|---|
| *F16K 31/12* | (2006.01) | |
| *F16K 15/14* | (2006.01) | |
| *F16K 15/02* | (2006.01) | |
| *F16K 27/02* | (2006.01) | |

(52) U.S. Cl.
CPC ............ *F16K 31/12* (2013.01); *F16K 15/023* (2013.01); *F16K 15/144* (2013.01); *F16K 15/147* (2013.01); *F16K 27/0209* (2013.01)

(58) Field of Classification Search
CPC ...... F16K 31/12; F16K 15/023; F16K 15/144; F16K 27/0209; Y10T 137/7882; Y10T 137/7879; Y10T 137/7886; Y10T 137/7883; Y10T 137/788
See application file for complete search history.

(56) References Cited

U.S. PATENT DOCUMENTS

| | | | | |
|---|---|---|---|---|
| 3,320,972 A | * | 5/1967 | High ................... | A61F 2/2415 137/844 |
| 4,465,102 A | | 8/1984 | Rupp | |
| 4,492,253 A | | 1/1985 | Raftis | |
| 4,585,031 A | * | 4/1986 | Raftis ..................... | E03F 7/02 137/846 |
| 4,870,992 A | | 10/1989 | Irwin et al. | |

(Continued)

FOREIGN PATENT DOCUMENTS

KR      101206969 B1     12/2012

*Primary Examiner* — Jessica Cahill
(74) *Attorney, Agent, or Firm* — The Webb Law Firm

(57) ABSTRACT

A check valve includes a tubular sleeve bounding a longitudinally-extending flow-through passage for fluids, a disc having a first material affixed along a first portion of its periphery to a flexible hinge member, and a bill affixed at a first end to one or more of the sleeve, the flexible hinge member, and the disc. The check valve also includes one or more of the following of (i), (ii), and (iii): (i) at least one groove, rib, insert, or combination thereof that extends longitudinally along a length of the disc, the bill, or both the disc and the bill; (ii) at least one groove, notch, rib, insert, or combination thereof that extends laterally along a width of the bill; and (iii) at least one ripple that extends longitudinally along a length of the bill and, optionally, longitudinally along a length of the disc.

21 Claims, 12 Drawing Sheets

(56) References Cited

U.S. PATENT DOCUMENTS

| | | | |
|---|---|---|---|
| 5,215,123 A * | 6/1993 | Raftis | F16K 17/02 |
| | | | 137/513.5 |
| 5,301,707 A | 4/1994 | Hofsteenge | |
| 5,330,437 A * | 7/1994 | Durman | A61M 39/06 |
| | | | 137/846 |
| 5,727,593 A | 3/1998 | Duer | |
| 5,769,125 A | 6/1998 | Duer et al. | |
| 5,881,772 A | 3/1999 | Bennett | |
| 5,931,197 A | 8/1999 | Raftis et al. | |
| 6,585,005 B1 * | 7/2003 | Raftis | F16K 15/147 |
| | | | 137/846 |
| 6,810,914 B2 | 11/2004 | Persson | |
| 7,182,771 B1 * | 2/2007 | Houser | A61B 17/0644 |
| | | | 606/155 |
| 7,445,028 B1 | 11/2008 | Aanonsen et al. | |
| 8,196,894 B2 | 6/2012 | Spahr et al. | |
| 2008/0185245 A1 | 8/2008 | Park | |
| 2009/0100811 A1 | 4/2009 | Scheckel et al. | |
| 2010/0310397 A1 * | 12/2010 | Janse Van Rensburg | F04B 43/04 |
| | | | 417/488 |
| 2013/0117921 A1 * | 5/2013 | Stanaland | A47K 1/14 |
| | | | 4/295 |

\* cited by examiner

ELASTOMERIC IN-LINE TIDE GATE VALVE

CROSS-REFERENCE TO RELATED APPLICATIONS

This application claims the benefit of U.S. Provisional Patent Application No. 62/364,980, filed Jul. 21, 2016, which is incorporated herein by reference in its entirety.

BACKGROUND OF THE INVENTION

Field of the Invention

This invention generally relates to check valves, and, in particular, to tide gate valves.

Description of Related Art

A check valve is essentially a valve which allows fluid flow in only one direction through a conduit, while closing and preventing back or reverse flow, when back pressure builds up downstream of the valve to a level greater than the upstream fluid pressure head.

One example where the fluid backflow problem is especially acute occurs where such valves are used to handle storm sewer effluent. Virtually all municipalities near waterways have storm sewer pipes which empty into the waterways. When there is a storm, storm water from the streets runs into these sewer pipes and flows 1 into the waterways. When the tide is in, or river level is high, these sewer pipes back fill with the water from the waterway. This leaves no, or reduced storage capacity in the sewer pipes. In the event there is a large cloudburst or storm during the time that the tide is in, all, or a portion of the storm water cannot get in the sewer because the sewer pipes are at least partially filled. This causes street flooding.

Further, sewage treatment plants are often located at sea level and/or the lowest point possible of a municipality. They discharge a large quantity of water after treatment of sewage. Where such treatment plants discharge into a body of salt water, positive shut off is mandatory to prevent salt water intrusion. Salt water intrusion is the backflowing of salt water into the plant. Salt water intrusion must be prevented because salt water will destroy the ongoing biological treatment of sewage, forcing the plant to discharge raw sewage into the waterways, which is a situation that must be avoided.

The cost to water treatment facilities to correct the problems created by a malfunctioning check valve can be enormous. Prior art metal check valves have a tendency to have higher head loss pressures and malfunction due to rust clogging hinges associated with such valves. Prior art rubber valves suffer from the higher head loss pressure limitations described above.

Another example where the fluid backflow problem is especially acute is where the check valves are used in chemical plants or municipal waste treatment plants. In such applications, it is desired to permit waste water or treatment chemicals to enter a reaction vessel or pond from a storage container without permitting the contents of the reaction vessel to backflow into a storage container as the chemical reactions proceed.

To address the previously described problems, various types of check valves have been developed. One type of check valve that has been developed to counter these problems is known as a tide gate type check valve. An example of a tide gate type check valve is described in U.S. Pat. No. 5,769,125. However, while the check valve described in U.S. Pat. No. 5,769,125 addresses the previously described backflow problems, the check valve requires a finite minimum amount of upstream pressure greater than the downstream pressure before the valve will open. For example, it may require 13 inches of positive differential pressure before a 12 inch diameter valve will open. At this pressure, the valve opens abruptly from fully closed to partially open, commonly referred to as snapping open. In many applications, this is undesirable.

Thus, it is desirable to provide an improved tide gate check valve that requires a lower amount of positive differential pressure to "snap" open. It is also desirable to provide a tide gate check valve that has a lower ratio of lateral stiffness to the longitudinal stiffness which in turn reduces the ratio of headloss (pressure drop in the forward flow direction) to backpressure capability (pressure withstanding capability in the reverse direction when the valve is closed).

SUMMARY OF THE INVENTION

The present invention is directed to a check valve that includes: (a) a tubular sleeve bounding a longitudinally-extending flow-through passage for fluids, the sleeve having an upstream fluid inlet end region and a downstream fluid outlet region, wherein the upstream fluid inlet end region and/or the downstream fluid outlet region is adapted to be affixed to an effluent conduit; (b) the downstream fluid outlet region of the sleeve being integrally formed with a longitudinally-extending trough, the trough having a bottom wall and a pair of side walls integral with the bottom wall, the trough formed with the downstream fluid outlet region of the sleeve so as to provide a flow-through passage for the fluids; (c) a disc having a first material affixed along a first portion of its periphery to a flexible hinge member, the flexible hinge member affixed to and interposed between the disc and the downstream fluid outlet region of the sleeve, the flexible hinge member having a second material which is more flexible than the first material of the disc, and in which a second portion of the periphery of the disc opposite the first portion rests within the trough on the bottom wall of the trough when the valve is in a closed position, wherein the disc opens the valve in response to positive differential pressure within the valve; (d) a bill affixed at a first end to one or more of the group consisting of the sleeve, the flexible hinge member, and the disc, the bill extending longitudinally downstream along the longitudinal axis of the trough, the bill being integrally formed with the side walls of the trough, the bill being formed of a flexible material and forming an opening for discharge of fluid in response to a positive differential pressure within the valve from the fluid, and the bill forming a seal to prevent backflow of the fluid through the valve when no differential pressure or negative differential pressure is present; and (e) one or more of the following of (i), (ii), and (iii): (i) at least one groove, rib, insert, or combination thereof that extends longitudinally along a length of the disc, the bill, or both the disc and the bill; (ii) at least one groove, notch, rib, insert, or combination thereof that extends laterally along a width of the bill; and (iii) at least one ripple that extends longitudinally along a length of the bill and, optionally, longitudinally along a length of the disc.

The at least one groove, rib, or insert of (i) can extend continuously and/or intermittently along the length of the disc, the bill, or both the disc and the bill. The at least one groove, rib, or insert of (i) can also extend along the length of the disc, the bill, or both the disc and the bill at an angle. In addition, the at least one groove, rib, or insert of (i) can be tapered. In some embodiments, the check valve comprises two or more grooves, ribs, or inserts of (i) and at least two of the grooves, ribs, or inserts are interconnected.

The at least one groove, rib, or insert of (i) can be formed along at least one of a downstream side and an upstream side of the disc. The at least one groove or rib of (i) and (ii) can have various shapes including, but not limited to, a round shape, trapezoidal shape, rectangular shape, a square shape, V shape, or combinations thereof. The at least one insert of (i) and (ii) can have various shapes including, but not limited to, a circular shape, hexagonal shape, rectangular shape, a square shape, a shape that forms long wide strips, or combinations thereof. Further, the check valve itself can also have various shapes including, but not limited to, a circular shape or a rectangular shape.

In certain embodiments, the check valve comprises both (e)(i) and (e)(ii). In some embodiments, the check valve comprises (e)(iii) and at least one of (e)(i) and (e)(ii).

The disc of the check valve can have a width that is coextensive with the pair of side walls of the trough, the disc forming a seal with the side walls when the valve is in a closed position. Moreover, the sleeve, trough, flexible hinge member, disc, and bill can each be formed of one or more plies of an elastomeric material.

The present invention is also directed to a check valve assembly comprising: (a) a check valve as described above and as further described herein; (b) a tubular body; and (c) a conduit. The check valve is integrally formed within the tubular body and the tubular body is positioned within the conduit. A downstream region of the tubular body can be affixed to an interior portion of the conduit. In some embodiments, the entire lower portion of the check valve below a plane of a horizontal centerline of the check valve is vulcanized to the tubular body. The portions of the check valve above the plane of the horizontal centerline of the valve that are in contact with the tubular body when the check valve is fully closed can also be vulcanized to the tubular body. The bill and disc of the check valve are separated from the interior portions of the tubular body such that the bill and disc are not vulcanized to the tubular body.

BRIEF DESCRIPTION OF THE DRAWINGS

FIG. 1b is an end view of the valve of FIG. 1a.

FIG. 1c is a top view of the valve of FIG. 1a.

FIG. 1d a perspective cutaway view of the valve of FIG. 1a.

FIG. 2b is an end view from the downstream end of the check valve of FIG. 2a.

FIG. 3b is an end view from the downstream end of the check valve of FIG. 3a.

DESCRIPTION OF THE INVENTION

Figure 1A:
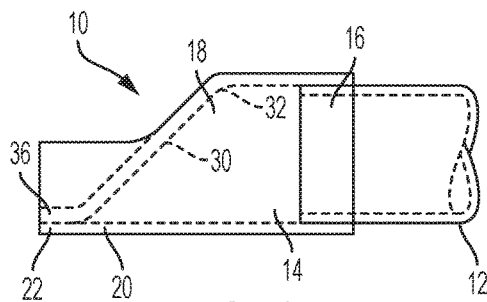
FIG. 1a is a side cutaway view of a prior valve as described in U.S. Pat. No. 5,769,125.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Further, the terms "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the specification, are simply exemplary embodiments of the invention. Hence, specific dimensions and other physical characteristics related to the embodiments disclosed herein are not to be considered as limiting.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Further, as used herein, the term "differential pressure" refers to the difference between the upstream and downstream pressures. A "positive differential pressure" refers to a condition where the upstream pressure is greater than the downstream pressure. This is also referred to as "headloss". In addition, a "negative differential pressure" refers to a condition where the downstream pressure is greater than the upstream pressure. This is also referred to as "backpressure". When the upstream and downstream pressures are equal to each other, the terms "no differential pressure" or "zero differential pressure" are used. This is also referred to as "no headloss" or "zero headloss".

A known tide gate check valve, as described in U.S. Pat. No. 5,769,125, is illustrated in FIGS. 1*a* through 1*d*. Referring to FIGS. 1*a* through 1*d*, a tide gate valve 10 is shown mounted at a discharge end of a conduit 12, from which fluids are discharged in the direction shown by the arrows A and A'. The conduit 12 may be a storm sewer, an industrial waste pipe, or any pipe which discharges an effluent into a river, creek, ocean, or analogous waterway, or a chemical reaction vessel or any vessel known in the art where it is desired to discharge a fluid while preventing backflow into the conduit 12.

The valve 10 generally comprises a sleeve 14, which bounds a longitudinally-extending flow-through passage for the effluent fluid which maybe a gas, liquid, or slurry, such as raw sewage, storm rain water, sludge, chemical slurry, scum paper stock, tailings slurry, or any industrial waste. More specifically, the housing sleeve 14 has a generally tubular upstream fluid inlet region 16. Further, the sleeve 14 terminates at a second downstream end with a fluid outlet region 18. The fluid inlet region 16 of the sleeve 14 and/or the downstream end with the fluid outlet region 18 of the sleeve 14 can be mounted on or within the conduit 12, such as at the discharge end of the conduit 12 for example. When the valve 10 is positioned within the conduit 12, the outer surface of the valve 10 abuts the inner surface of the conduit 12. In addition, the valve 10 can be positioned within the conduit 12 at different degrees. For instance, only a portion of the valve 12 can be positioned within the conduit 12, or the entire valve 10 can be positioned within the conduit 12. The end of the fluid outlet region 18 of the valve 12 can also be positioned flush with the outlet of the conduit 12.

Fluid inlet region 16 and/or the downstream end with the fluid outlet region 18 may be secured, affixed, attached, or otherwise mated to the conduit 12, such as within the interior or onto the exterior of the conduit 12, by any devices commonly known in the art such as bands, clamps, etc. For example, fluid inlet region 16 and/or the downstream end with the fluid outlet region 18 may be secured or affixed to the interior of conduit 12 by means known in the art. In still another embodiment, fluid inlet region 16 and/or the downstream end with the fluid outlet region 18 may include a flange which corresponds to a mating flange of conduit 12, and the two flanges, when mated, may be secured to each other by any means known in the art, such as bolts and nuts and the like. Other non-limiting examples include anchoring methods that do not use flanges.

Figure 1B:
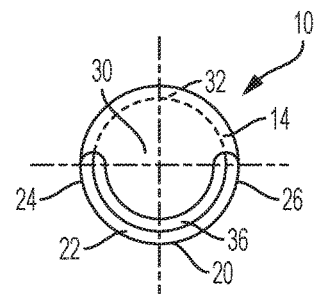
Figure 1C:
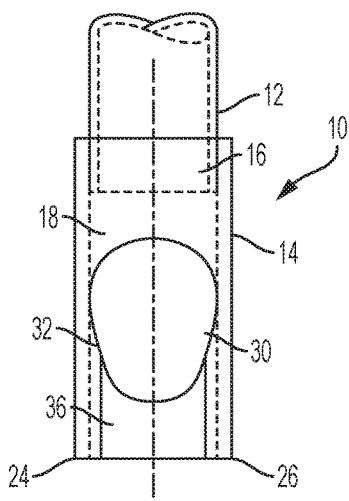

As indicated, the sleeve 14 terminates at a second downstream end with a fluid outlet region 18. Further, fluid outlet region 18 is integrally associated with a trough 20. Trough 20 is shown in FIGS. 1*a*, 1*b*, and 1*c* as semi-cylindrical in design, but it is to be understood that it could be designed as a U-shaped or V-shaped channel or the like. While a semi-cylindrically shaped trough 20 typically does not include a pair of clearly defined side walls and a clearly defined bottom wall, conceptually at least for the following discussion, it will be assumed that the semi-cylindrical shaped trough 20 is comprised of a bottom wall 22 and two side walls, 24 and 26 respectively.

Referring to FIGS. 1*a* through 1*d*, sleeve 14 and trough 20 are formed of materials having sufficient strength to support the weight and pressure of effluent flowing through valve 10. This material may take the form of one or more layers or plies of elastomeric material with or without reinforcing fabric. When formed of an elastomeric material, or elastomeric material with reinforcing fabric, the material and the number and thickness of layers or plies are selected based upon the weight of effluent that will be traveling through valve 10 so as to minimize sagging or distortion of sleeve 14 or trough 20. For most applications, a Shore A durometer of 65 to 95 will suffice.

Figure 1D:
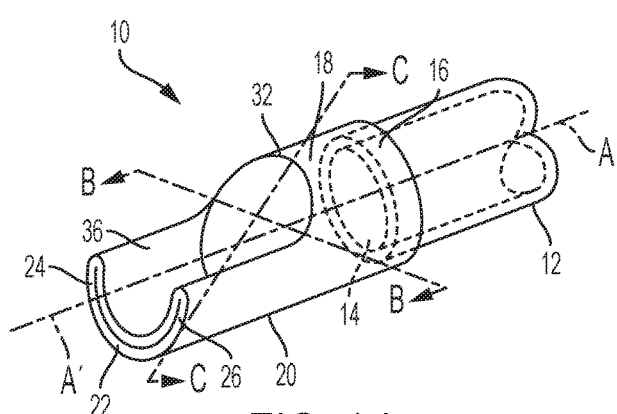

Valve 10 further includes disc 30 as shown in FIGS. 1*a* through 1*d*. Disc 30 is composed of an elastomeric material and is affixed to fluid outlet region 18 of sleeve 14 via flexible member 32, which is in the nature of an elastomeric hinge. In one embodiment, the width of disc 30, as shown along line B-B in FIG. 1*d* is coextensive with the distance between side walls 24 and 26 of valve 10, thereby forming a seal against fluid from backflowing through valve 10 into conduit 12, with additional sealing being accomplished by bill 36. The length of disc 30 as measured along line C-C of FIG. 1*d*, and extending from flexible member 32 to bottom wall 22 of trough 20 must be longer than the interior diameter of sleeve 14. As shown in FIGS. 1*a* through 1*d*, this will prevent disc 30 from assuming a perpendicular or 90 degree angle with bottom wall 22, but will instead, ensure that disc 30 in a closed position assumes the inclined plane position as shown in FIGS. 1*a* through 1*d*. Such a position will prevent disc 30 from inverting and entering sleeve 14 and reduce the amount of positive differential pressure through sleeve 14 that is needed to open valve 10, and facilitate less than full flows of effluent through conduit 12.

Flexible member 32 may be any hinge known in the art, but is typically an elastomeric hinge comprised of one or more plies of an elastomeric material, or fabric reinforced elastomeric material. Flexible member 32 may be of "tirecord" design, which is a polyester fabric that has considerable strength in one direction and is very flexible at right angles to the first direction. Further, the flexible member 32 may be made with a lower durometer rubber to provide greater flexibility in this area.

Other non-limiting features of a tide gate check-valve that can be used with the present invention are disclosed in U.S. Pat. No. 5,769,125, which is incorporated by reference herein in its entirety.

Figure 2A:
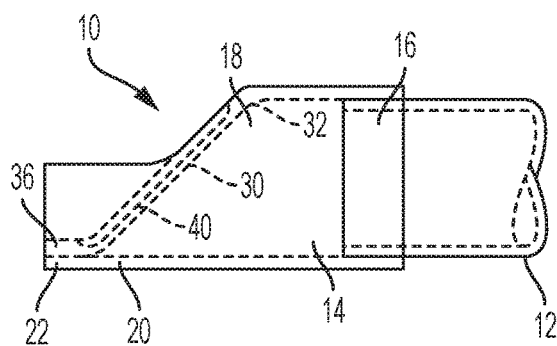
FIG. 2a is a side cutaway view of a check valve according to the present invention with a single groove.
Figure 2B:
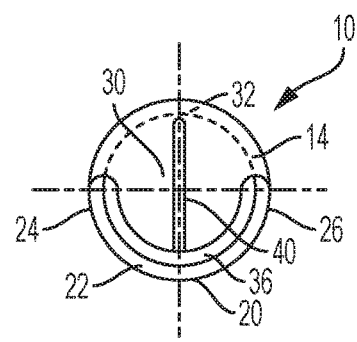
Figure 2C:
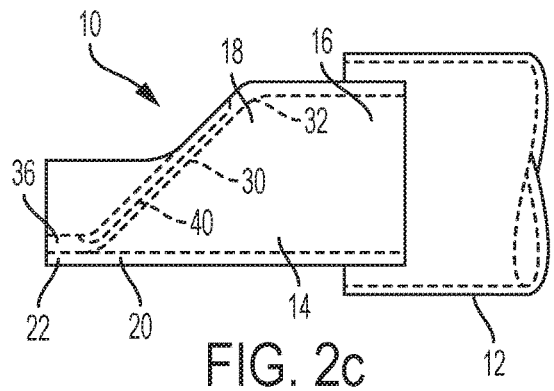
FIG. 2c is a side cutaway view of a check valve according to the present invention with a single groove and which is extending into the interior of a conduit.
Figure 2D:
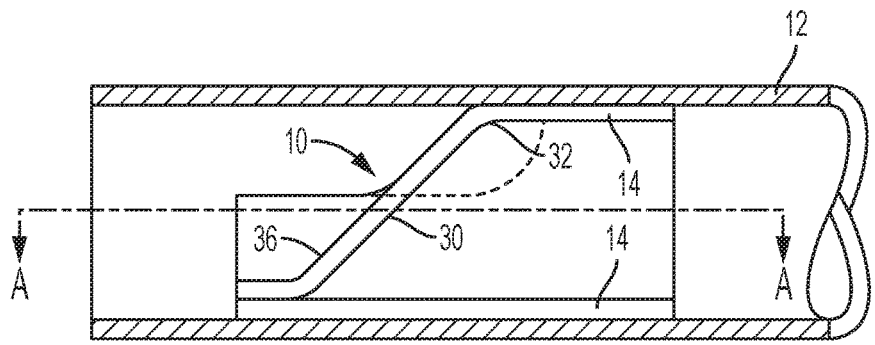
FIG. 2d illustrates the tide gate check valve according to the present invention with a single groove and which is positioned within a conduit.

In some embodiments, the check valves 10 of the present invention also include one or more grooves that extend longitudinally along the length of the disc 30 only, longitudinally along the length of the bill 36 only, or longitudinally along the length of both the disc 30 and the bill 36. For example, as shown FIGS. 2*a* and 2*b*, the tide gate check valves 10 of the present invention can include a single groove 40 formed longitudinally along the length of the disc 30 and which partially extends longitudinally along the length of the bill 36. Further, FIG. 2*c* illustrates the tide gate check valve 10 of FIG. 2*a* extending into the interior of conduit 12, and FIG. 2*d* illustrates the tide gate check valve of the present invention positioned within conduit 12.

Figure 3A:
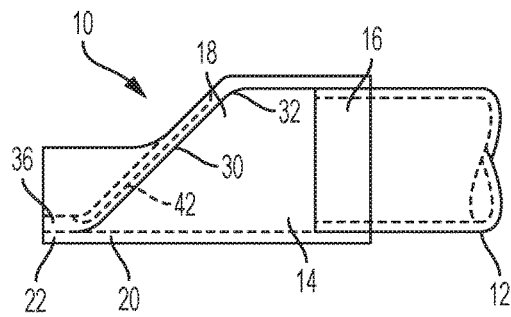
FIG. 3a is a side cutaway view of a check valve according to the present invention with multiple grooves.
Figure 3B:
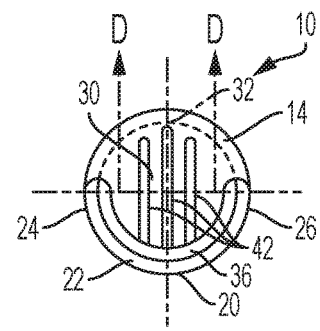
Figure 3C:
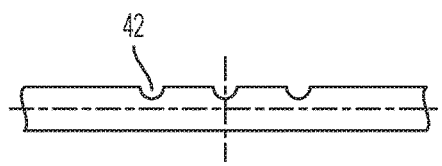
FIG. 3c is a sectional D-D view of FIG. 3b with rounded shaped grooves in the downstream side of the check valve.
Figure 3D:
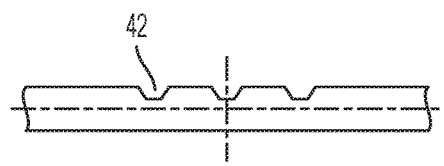
FIG. 3d is a sectional D-D view of FIG. 3b with trapezoidal shaped grooves in the downstream side of the check valve.
Figure 3E:
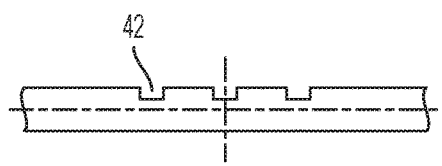
FIG. 3e is a sectional D-D view of FIG. 3b with rectangular/square shaped grooves in the downstream side of the check valve.
Figure 3F:
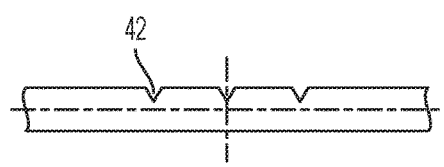
FIG. 3f is a sectional D-D view of FIG. 3b with "V" shaped grooves in the downstream side of the check valve.

Referring to FIGS. 3*a* and 3*b*, the tide gate check valves 10 of the present invention can also include multiple grooves 42 formed longitudinally along a length of the disc 30 and which partially extend longitudinally along the length of the bill 36. It is appreciated that the grooves 42 can be formed on either the downstream side of the disc 30, on the upstream side of the disc 30, or a combination of both.

Figure 3G:
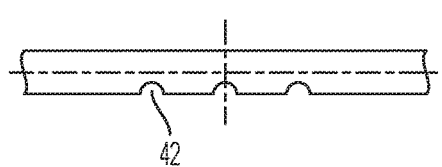
FIG. 3g is a sectional D-D view of FIG. 3b with rounded shaped grooves in the upstream side of the check valve.
Figure 3H:
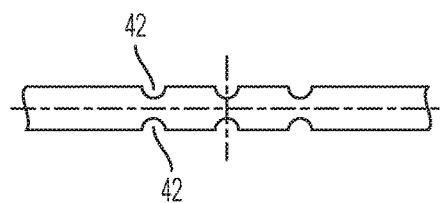
FIG. 3h is a sectional D-D view of FIG. 3b with rounded shaped grooves in the upstream and downstream side of the check valve.

The groove(s) 40, 42 that are formed in the disc 30 and/or bill 36 of the check valve 10 can have various shapes. For example, as shown in FIGS. 3*c* through 3*f*, the checks valve 10 of can have rounded shaped grooves 42, trapezoidal shaped grooves 42, rectangular/square shaped grooves 42, and "V" shaped grooves 42, respectively. The check valve 10 can also include multiple grooves 42 with different shapes such as any combination of the shapes previously described. Further, FIG. 3*g* illustrates rounded shaped grooves 42 on the upstream side of the disc 30, and FIG. 3*h* illustrates rounded shaped grooves 42 on both the upstream side and downstream side of the disc 30.

Figure 4:
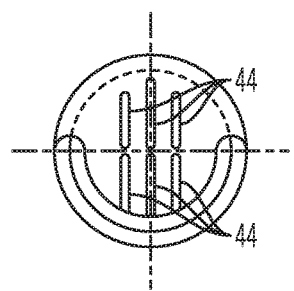
FIG. 4 is an end view from the downstream end of a check valve according to the present invention with multiple intermittent grooves.

The check valve 10 of the present invention can also include grooves 42 arranged intermittently and/or continuously along the length of the disc 30 and/or bill 36. As used herein, a "groove arranged continuously" refers to a groove aligned in a particular direction along the disc 30 and/or bill 36 without interruption, and a "groove arranged intermittently" refers to two or more grooves aligned in the same direction along the disc 30 and/or bill 36 and which are spaced apart from each other. For instance, as shown in FIG. 4, the check valve 10 can have multiple grooves 44 that intermittently extend longitudinally along the length of the disc 30 and at least partially along the length of the bill 36.

Figure 5:
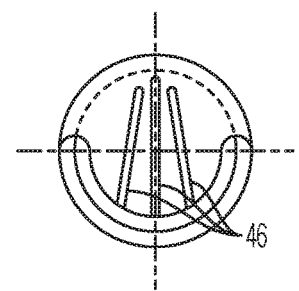
FIG. 5 is an end view from the downstream end of a check valve according to the present invention with multiple grooves at an angle.
Figure 6:
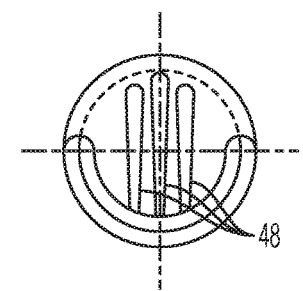
FIG. 6 is an end view from the downstream end of a check valve according to the present invention with multiple grooves in which at least some of the grooves are tapered.
Figure 7:
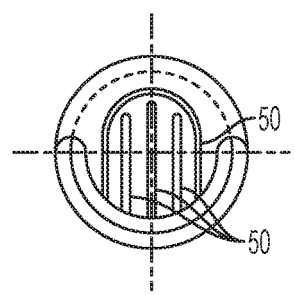
FIG. 7 is an end view from the downstream end of a check valve according to the present invention with multiple grooves in which at least some of the grooves are interconnected.

As shown in FIGS. 5-7, the grooves 42 can be arranged at various angles along the length of the disc 30 and/or bill 36, can have varying widths, can be interconnected to each other, or any combination thereof. Particularly, FIG. 5 illustrates a check valve 10 with multiple grooves 46 that each continuously extend along the length of the disc 30 and at least partially along the length of the bill 36 in which at least some of the grooves 46 are at an angle. FIG. 6 illustrates multiple grooves 48 that are tapered. Further, FIG. 7 shows grooves 50 extending along the length of the disc 30 and at least partially along the length of the bill 36 with at least some of the grooves 50 interconnected to each other.

The grooves, including any of the grooves previously described such as grooves 42 for example, can be formed using various techniques known in the art. For instance, the grooves may be formed by molding, using raised portions on the plates that are clamped on the disc and/or bill during the vulcanization process. In some embodiments, the grooves are molded during the vulcanizing process. The depth, shape, and width of the grooves are chosen to provide the desired flexibility in the disc and/or bill.

It was found that the grooves, including any of the grooves previously described such as grooves 42 for example, help increase flexibility in the lateral direction without appreciably reducing the strength or stiffness in the longitudinal direction. This results in a significant reduction in headloss with only a minimum reduction in backpressure capability.

The check valve 10 of the present invention can also include one or more ribs 52 or 54 that extend out from the disc 30 and/or the bill 36 of the valve 10. The ribs 52, 54 can be formed from the same material as the contiguous material that forms the disc 30 and/or the bill 36 of the valve 10. Alternatively, the ribs 52, 54 can be formed from different materials that are used to form the contiguous material of the disc 30 and/or bill 36. For instance, the ribs 52, 54 can be formed from a rigid material such as a metal, flexible materials such as elastomer or fabric reinforced elastomer with either a higher or lower durometer than the contiguous material, or a combination of such materials.

Figure 8:
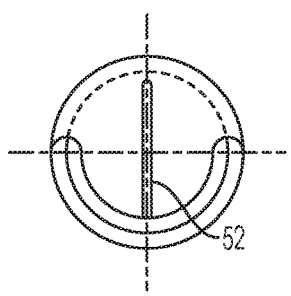
FIG. 8 is an end view from the downstream end of a check valve according to the present invention with a single rib.
Figure 9A:
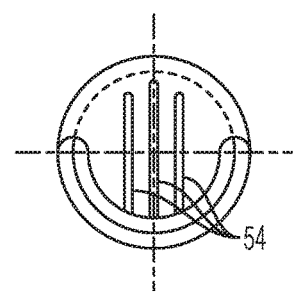
FIG. 9a is an end view from the downstream end of a check valve according to the present invention with multiple ribs.
Figure 9B:
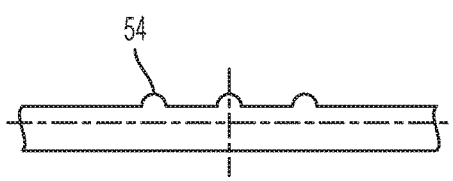
FIG. 9b is a sectional D-D view of FIG. 9a with rounded shaped ribs in the downstream side of the check valve.
Figure 9C:
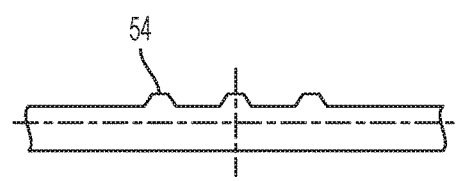
FIG. 9c is a sectional D-D view of FIG. 9a with trapezoidal shaped ribs in the downstream side of the check valve.
Figure 9D:
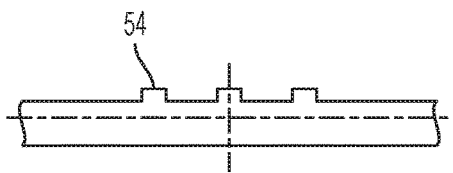
FIG. 9d is a sectional D-D view of FIG. 9a with rectangular/square shaped ribs in the downstream side of the check valve.

The ribs 52, 54 can be formed on the disc 30 only, the bill 36 only, or on both the disc 30 and the bill 36. For example, referring to FIG. 8, the check valve 10 can include a single rib 52 that extends longitudinally along the length of the disc 30 and at least a portion of the length of the bill 36. As shown in FIG. 9a, the check valve 10 can also have multiple ribs 54 that extend longitudinally along the length of the disc 30 and at least a portion of the length of the bill 36.

Figure 9E:
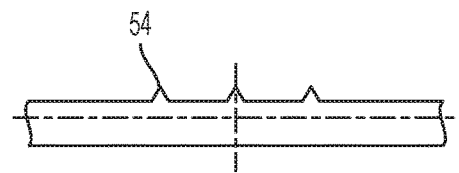
FIG. 9e is a sectional D-D view of FIG. 9a with "V" shaped ribs in the downstream side of the check valve.
Figure 9F:
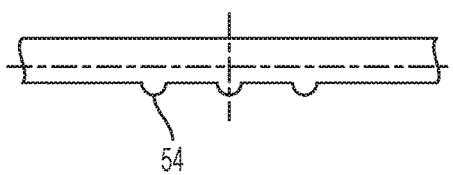
FIG. 9f is a sectional D-D view of FIG. 9a with rounded shaped ribs in the upstream side of the check valve.
Figure 9G:
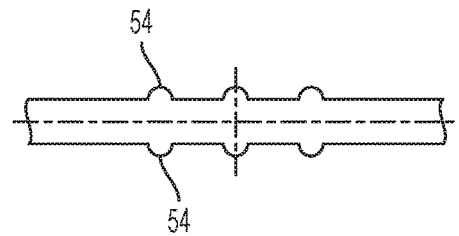
FIG. 9g is a sectional D-D view of FIG. 9a with rounded shaped ribs in the upstream and downstream side of the check valve.

The ribs 52, 54 formed on the disc 30 and/or bill 36 of the check valve 10 can have various shapes. For example, as shown in FIGS. 9b through 9e, the check valve 10 of the present invention can have rounded shaped ribs 54 (FIG. 9b), trapezoidal shaped ribs 54 (FIG. 9c), rectangular/square shaped ribs 54 (FIG. 9d), and "V" shaped ribs 54 (FIG. 9e). The check valve 10 can also include multiple ribs 54 with different shapes such as any combination of the shapes previously described. Further, the ribs 54 can be formed on either the downstream side of the disc 30, on the upstream side of the disc 30, or a combination of both. For instance, FIG. 9f illustrates ribs 54 on the upstream side of the disc 30, and FIG. 9g illustrates ribs 54 on both the downstream side of the disc 30 and the upstream side of the disc 30.

Figure 10:
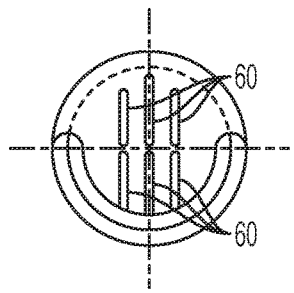
FIG. 10 is an end view from the downstream end of a check valve according to the present invention with multiple intermittent ribs.

The check valve 10 of the present invention can also include multiple ribs 54 arranged intermittently and/or continuously longitudinally along the length of the disc 30 and/or bill 36. As used herein, a "rib arranged continuously" refers to a rib aligned in a particular direction along the disc 30 and/or bill 36 without interruption, and a "rib arranged intermittently" refers to two or more ribs aligned in the same direction along the disc 30 and/or bill 36 and which are spaced apart from each other. For example, as shown in FIG. 10, the check valve 10 can have multiple ribs 60 that intermittently extend along the length of the disc 30 and at least partially along the length of the bill 36.

Figure 11:
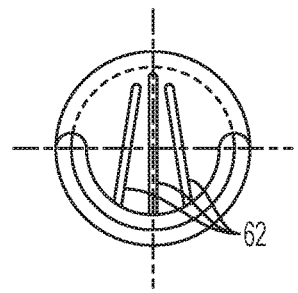
FIG. 11 is an end view from the downstream end of a check valve according to the present invention with multiple ribs at an angle.
Figure 12:
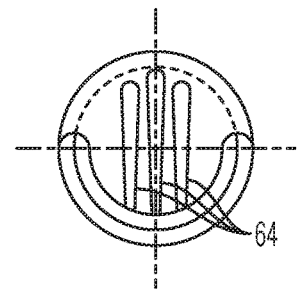
FIG. 12 is an end view from the downstream end of a check valve according to the present invention with multiple ribs in which at least some of the ribs are tapered.
Figure 13:
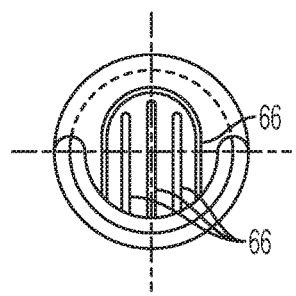
FIG. 13 is an end view from the downstream end of a check valve according to the present invention with multiple ribs in which at least some of the ribs are interconnected.

As shown in FIGS. 11-13, the ribs 54 can be arranged at various angles along the length of the disc 30 and/or bill 36, can have varying widths, can be interconnected to each other, or any combination thereof. Particularly, FIG. 11 illustrates a check valve 10 having multiple ribs 62 that are each continuously extending along the length of the disc 30 and at least partially along the length of the bill 36 in which at least some of the ribs 62 are at an angle. FIG. 12 illustrates a check valve 10 with multiple ribs 64 that are tapered, and FIG. 13 illustrates multiple ribs 66 with at least some of the ribs 66 interconnected to each other.

The ribs, including any of the ribs previously described such as ribs 54 for example, shown can be formed using various techniques known in the art. For example, the ribs may be formed by molding, using recessed portions on the metal plates that are clamped on the disc and/or bill during the vulcanization process. In some embodiments, the ribs are molded during the vulcanizing process. The height, shape, and width of the ribs are chosen to provide the desired stiffness in the disc and/or bill.

It was found that ribs, including any of the ribs previously described such as ribs 54 for example, can help increase the strength or stiffness in the longitudinal direction without appreciably increasing the flexibility in the lateral direction. This results in a significant increase in backpressure capability with only a minimum increase in headloss.

In some embodiments, the check valve 10 of the present invention includes one or more inserts 68 or 69 incorporated into the disc 30 and/or the bill 36 of the valve 10. As used herein, an "insert" refers to a separate part that has material characteristics different from the surrounding material in the location where it is placed. The inserts 68, 69 incorporated into the disc 30 and/or the bill 36 of the valve 10 can be formed from rigid materials such as a metal, from a flexible material such as a stiff but flexible high durometer elastomer or fabric reinforced elastomer, from a soft flexible material such as a foam rubber, or any combination thereof.

Figure 14:
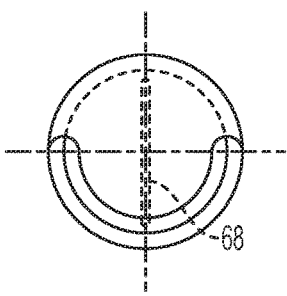
FIG. 14 is an end view from the downstream end of a check valve according to the present invention with a single insert.
Figure 15A:
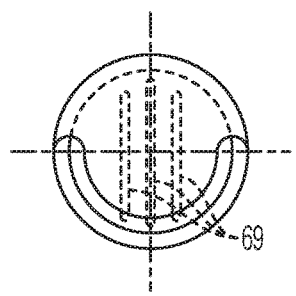
FIG. 15a is an end view from the downstream end of a check valve according to the present invention with multiple inserts.
Figure 15B:
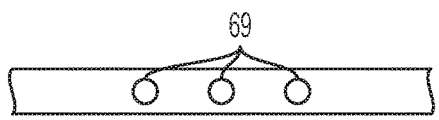
FIG. 15b is a sectional D-D view of FIG. 15a with circular shaped inserts.
Figure 15C:
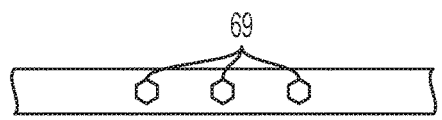
FIG. 15c is a sectional D-D view of FIG. 15a with hexagonal shaped inserts.
Figure 15D:
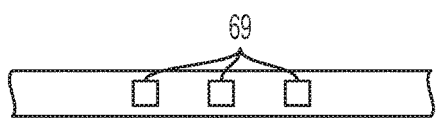
FIG. 15d is a sectional D-D view of FIG. 15a with rectangular/square shaped inserts.
Figure 15E:
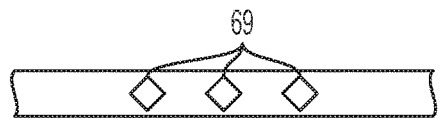
FIG. 15*e* is a sectional D-D view of FIG. 15*a* with square shaped inserts at an angle.
Figure 15F:
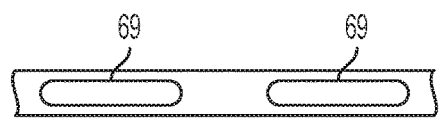
FIG. 15*f* is a sectional D-D view of FIG. 15*a* with thin wide shaped strips as the inserts.

Referring to FIG. 14, the check valve 10 can include a single insert 68 incorporated into the disc 30 and/or bill 36 or, as shown in FIG. 15a, the check valve 10 can include multiple inserts 69 incorporated into the disc 30 and/or bill 36. The inserts 68, 69 incorporated into the disc 30 and/or the bill 36 of the check valve 10 can have various shapes. For example, as shown in FIGS. 15b through 15f, the check valve 10 of the present invention can include circular shaped inserts 69 (FIG. 15b), hexagonal shaped inserts 69 (FIG. 15c), rectangular/square inserts 69 (FIG. 15d), square shaped inserts 69 that are angled (FIG. 15e), and inserts 69 that form long wide strips (FIG. 15f). The check valves 10 can also include multiple inserts 69 with different shapes such as any combination of the shapes previously described. Further, the inserts 69 can be incorporated into the disc 30 only, the bill 36 only, or in both the disc 30 and the bill 36.

Figure 16:
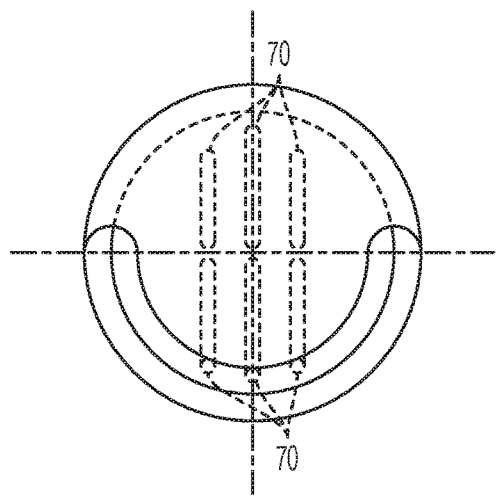
FIG. 16 is an end view from the downstream end of a check valve according to the present invention with multiple intermittent inserts.

The check valves 10 of the present invention can include one or multiple inserts 68, 69 arranged intermittently and/or continuously longitudinally along the length of the disc 30 and/or bill 36. As used herein, an "insert arranged continuously" refers to an insert aligned in a particular direction along the disc 30 and/or bill 36 without interruption, and an "insert arranged intermittently" refers to two or more inserts aligned in the same direction along the disc 30 and/or bill 36 and which are spaced apart from each other. For example, as shown in FIG. 16, the check valve 10 can have multiple inserts 70 that are intermittently incorporated longitudinally along the length of the disc 30 and at least partially along the length of the bill 36.

Figure 17:
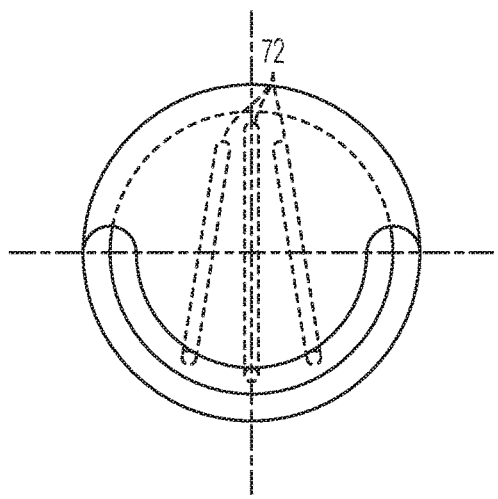
FIG. 17 is an end view from the downstream end of a check valve according to the present invention with multiple inserts at an angle.
Figure 18:
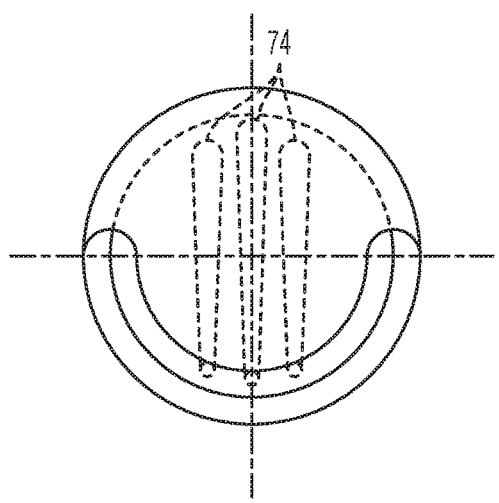
FIG. 18 is an end view from the downstream end of a check valve according to the present invention with multiple inserts in which at least some of the inserts are tapered.
Figure 19:
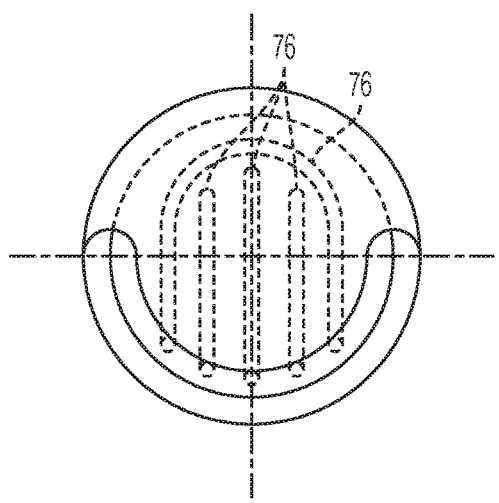
FIG. 19 is an end view from the downstream end of a check valve according to the present invention with multiple inserts in which at least some of the inserts are interconnected.

As shown in FIGS. 17-19, the inserts can be arranged at various angles along the length of the disc 30 and/or bill 36, can have varying widths, can be interconnected to each other, or any combination thereof. For instance, FIG. 17 illustrates a check valve 10 having multiple inserts 72 that are each continuously incorporated along the length of the disc 30 and at least partially along the length of the bill 36 in which at least some of the inserts 72 are at an angle. FIG. 18 illustrates a check valve 10 with multiple inserts 74 that are tapered, and FIG. 19 illustrates a check valve 10 with multiple inserts 76 in which at least some of the inserts 76 are interconnected to each other.

The inserts, including any of the inserts previously described such as inserts 69 for example, can be formed using various techniques known in the art. For example, metal inserts can be formed using machining, stamping, forging, and casting methods. Elastomer inserts can be formed by molding or cutting. In some embodiments, the inserts are molded during the vulcanizing process. It was found that the inserts, including any of the inserts previously described such as inserts 69 for example, can help modify the strength or stiffness of the valve in the longitudinal and lateral directions to meet the specific requirements of the intended application.

As indicated, the previously described grooves (such as grooves 40 and 42 for example), ribs (such as ribs 52 and 54 for example), and/or inserts (such as inserts 68 and 69 for example) that extend along the length of the disc 30 and/or bill 36 of a check valve 10 help adjust the lateral and/or longitudinal stiffness of the disc 30 and/or bill 36. By adjusting the lateral and/or longitudinal stiffness, the valve 10 can snap open with less positive differential pressure and/or lower the ratio of lateral stiffness to the longitudinal stiffness to sufficiently hold back the backpressure.

Figure 20A:
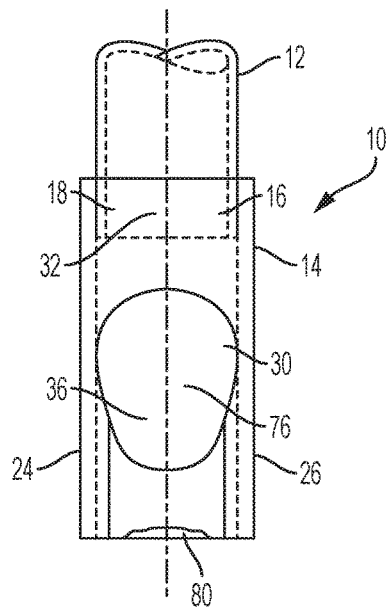
FIG. 20*a* is a top view of a check valve according to the present invention with a single curved notch in a portion of the valve.
Figure 20B:
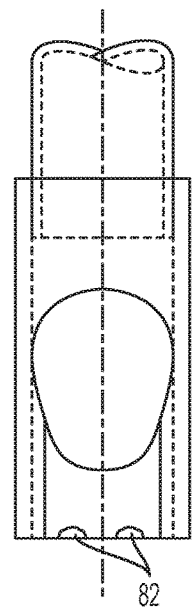
FIG. 20*b* is a top view of a check valve according to the present invention with multiple curved notches in a portion of the valve.
Figure 20C:
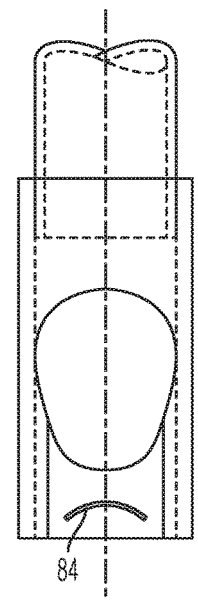
FIG. 20*c* is a top view of a check valve according to the present invention with a single curved groove in a portion of the valve.
Figure 20D:
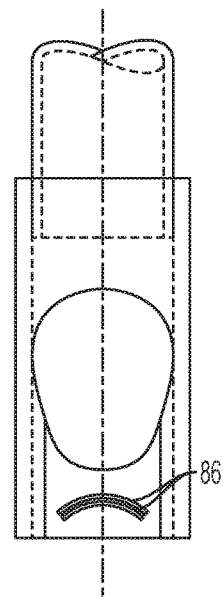
FIG. 20*d* is a top view of a check valve according to the present invention with multiple curved grooves in a portion of the valve.
Figure 20E:
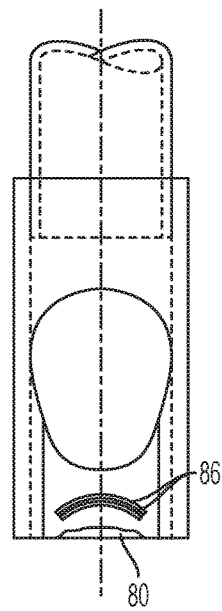
FIG. 20*e* is a top view of a check valve according to the present invention with a single curved notch and multiple curved grooves in a portion of the valve.
Figure 20F:
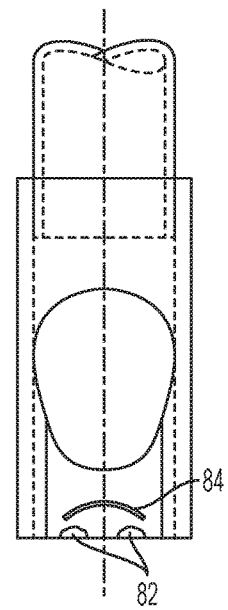
FIG. 20*f* is a top view of a check valve according to the present invention with multiple curved notches and a single curved groove in a portion of the valve.

In accordance with the present invention, the check valve 10 can also include grooves, notches such as in the shape of a scallop, ribs, inserts, or any combination thereof that extend across the width of the bill 36 that help adjust the stiffness of the bill 36. For example, FIG. 20a illustrates a check valve 10 with a single curved notch 80 extending across the width of the bill 36, FIG. 20b illustrates a check valve 10 with multiple curved notches 82 extending across the width of the bill 36, FIG. 20c illustrates a check valve 10 with a single curved groove 84 extending across the width of the bill 36, FIG. 20d illustrates a check valve 10 with multiple curved grooves 86 extending across the width of the bill 36, FIG. 20e illustrates a check valve 10 with both a single curved notch 80 and multiple curved grooves 86 extending across the width of the bill 36, and FIG. 20f illustrates a check valve 10 with both multiple curved notches 82 and a single curved groove 84 extending across the width of the bill 36. The previously described notches 80, 82 can be formed by removing some of the contiguous material that forms the bill 36, or alternatively, by molding the notches during the vulcanization process.

It is appreciated that the grooves, notches, ribs, and inserts that extend across the width of the bill 36 can be continuous, intermittent, angled, have varying widths, and/or have interconnected portions as previously described with respect to the grooves (such as grooves 40 and 42), ribs (such as ribs 52 and 54), and inserts (such as inserts 68 and 69) that extend along the length of the disc 30 and/or bill 36. It is also appreciated that the grooves, notches, ribs, and inserts that extend across the width of the bill 36 can be used in combination with the grooves (such as grooves 40 and 42), ribs (such as ribs 52 and 54), and inserts (such as inserts 68 and 69) that extend along the length of the disc 30 and/or bill 36.

In certain embodiments, referring to FIGS. 21a through 21d, the check valve 10 can include a ripple 38 that extends longitudinally along the length of the bill 36 and, optionally, at least a portion of the disc 30. The ripple 38 acts as a corrugation and allows greater flexibility in the bill 36 to reduce the propensity to "snap" open. The check valve 10 can include a single ripple 38 or multiple ripples 38. Further, the ripple 38 can be used in combination with any of the previously described grooves, notches, ribs, and inserts.

Figure 21A:
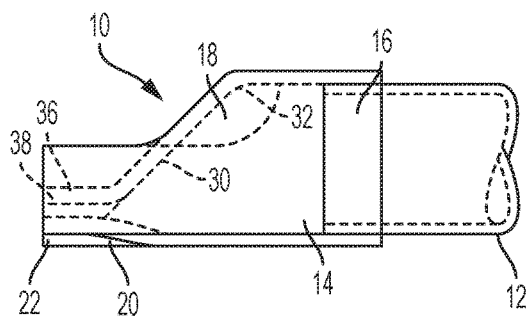
FIG. 21*a* is a side cutaway view of a check valve according to the present invention with a ripple formed in the bill and which extends into at least a portion of the disc.
Figure 21B:
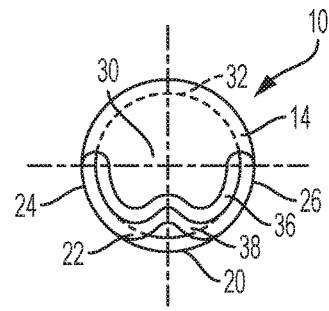
FIG. 21*b* is a front view of the check valve of FIG. 21*a*.
Figure 21C:
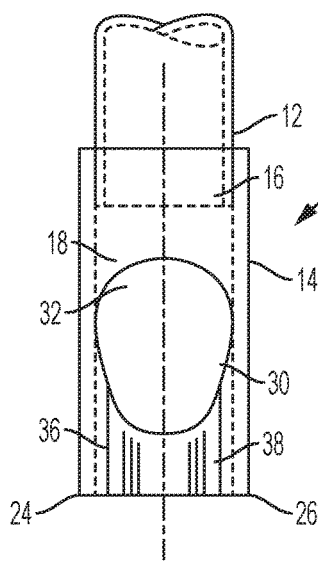
FIG. 21*c* is a top view of the check valve of FIG. 21*a*.
Figure 21D:
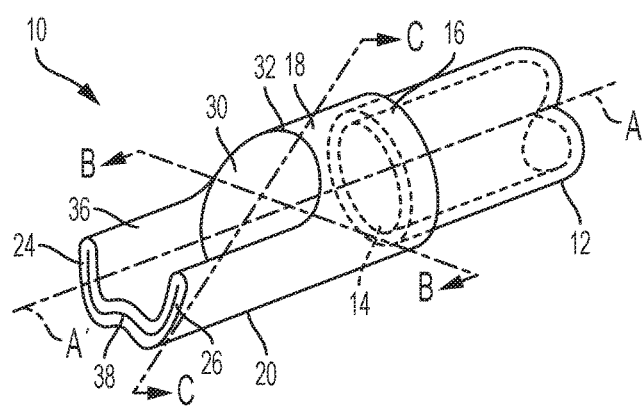
FIG. 21*d* is a perspective cutaway view of the check valve of FIG. 21*a*.
Figure 21E:
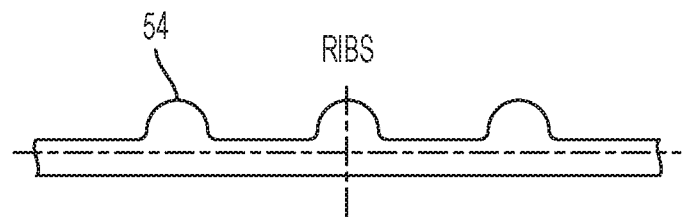
FIG. 21*e* is a sectional view of a check valve with ribs.
Figure 21F:
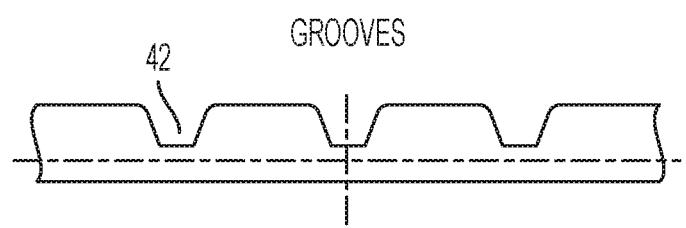
FIG. 21*f* is a sectional view of a check valve with grooves.

It is appreciated that ribs, including any of the ribs previously described such as ribs 54 for example, are added material that rises above the surface of the bill 36 and/or disc 30 such as is shown in FIG. 21e. The width of the ribs is typically less than the spaces between the edges of the ribs. In contrast, grooves, including any of the grooves previously described such as grooves 42 for example, are removed material from the surface of the bill 36 or disc 30 such as shown in FIG. 21f. The width of the grooves is typically less than the distance between the edges of the grooves.

Figure 21G:
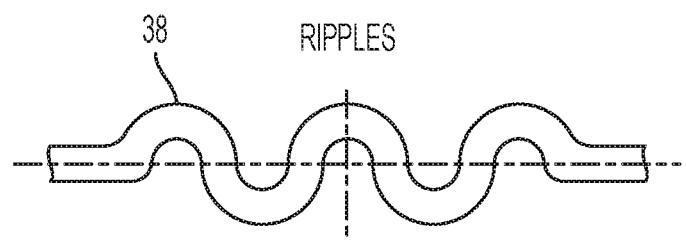
FIG. 21*g* is a sectional view of a check valve with ripples.

In comparison to ribs and grooves, a ripple, including any of the ripples previously described such as ripple 38 for example, has alternating ribs and grooves on both sides of the bill 36 and/or disc 36 where the ribs and grooves "nest" between each other providing a substantially uniform undulating wall thickness such as shown in FIG. 21g.

Referring to FIGS. 22a through 22d, the check valve 10 can be enclosed in an integral tubular body 17 which in turn is installed in a conduit 12 such as a pipe. As such, the present invention is also directed to a check valve assembly that includes any of the previously described check valves 10, an integral tubular body 17, and conduit 12. The check valve assembly provides a simple means to install a valve 10 and tubular body 17 assembly inside a conduit 12 such as at the discharge end for example without the necessity of having access to the upstream end of the valve 10, which in the case of small valves (less than 18 inches) is virtually impossible to do, and in the case of larger valves is inconvenient.

Figure 22A:
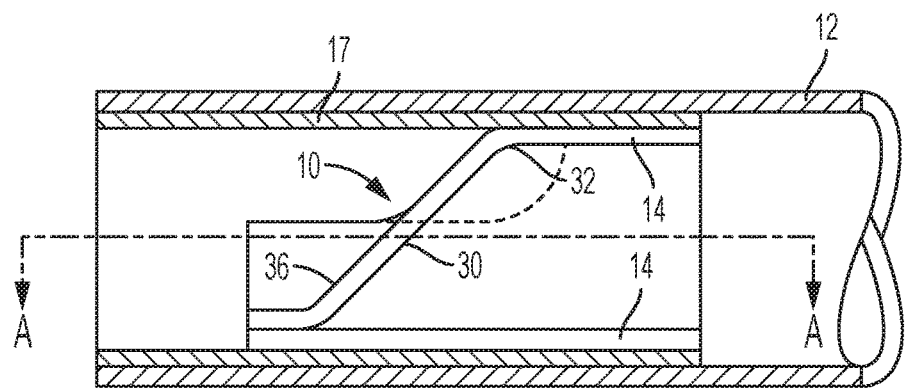
FIG. 22*a* is a side cutaway view of a check valve according to the present invention enclosed in an integral tubular body with the entire assembly installed in a conduit.
Figure 22B:
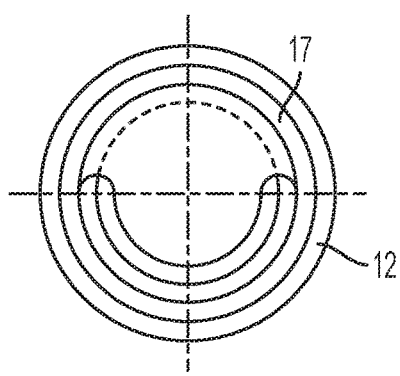
FIG. 22*b* is a front view of the check valve and assembly of FIG. 22*a*.
Figure 22C:
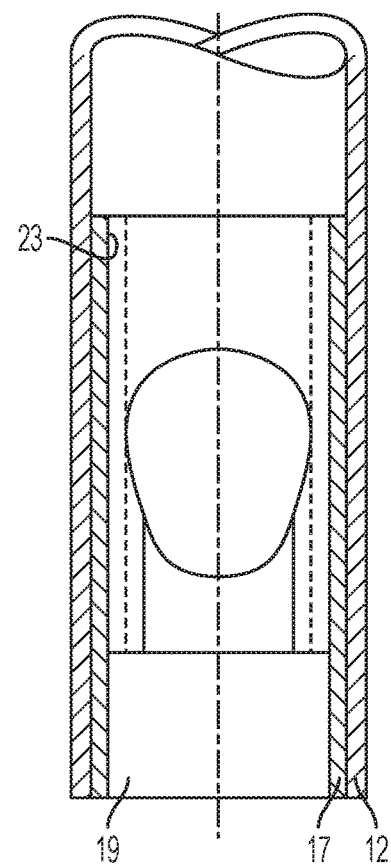
FIG. 22*c* is a top cutaway view of the check valve and assembly of FIG. 22*a*.
Figure 22D:
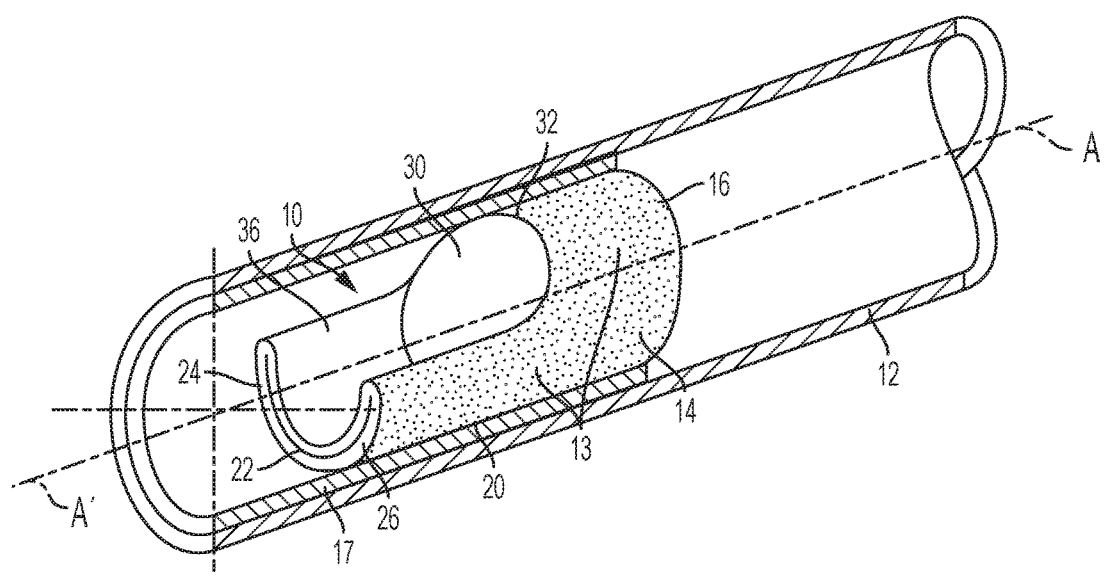
FIG. 22*d* is a perspective cutaway view of the check valve and assembly of FIG. 22*a*.

As shown in FIG. 22c, the downstream region 19 and/or the inlet region 23 of the tubular body 17 may be affixed, attached, or otherwise mated to the conduit 12, such as to the interior or exterior of the conduit 12, by means known in the art, such as internal expanding clamps. Alternatively, the downstream region 19 and/or the inlet region 23 may include a flange which corresponds to a mating flange on the conduit 12, and the two flanges, when mated, may be secured to each other by any means known in art, such as with bolts, nuts, and the like. Other non-limiting examples include anchoring methods that do not use flanges.

When the check valve 10 is integral with a tubular body 17, the entire lower portion of the check valve 10 below the plane of the horizontal centerline of the valve 10 is vulcanized to the tubular body 17. Further, the portions of the check valve 10 above the plane of the horizontal centerline of the valve 10 that are in contact with the tubular body 17 when the valve 10 is fully closed are vulcanized together. These vulcanized regions 13 are shaded in FIG. 22d. As further shown in FIG. 22d, the bill 36 and disc 30 of the valve 10 are not vulcanized to the tubular body 17 and are free to move upward allowing the valve 10 to open and discharge flow. As such, the bill 36 and disc 30 of the check valve 10 are separated from the interior portions of the tubular body 17.

Figure 23:
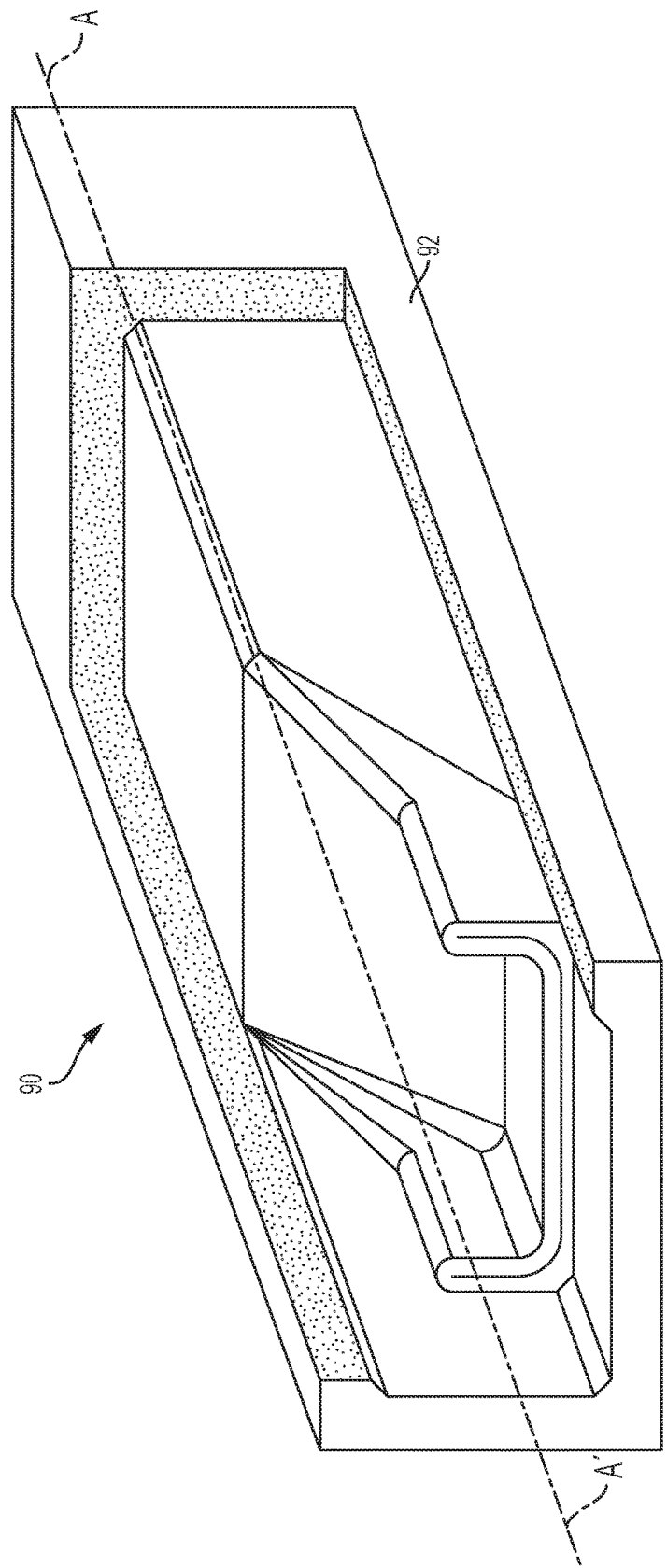
FIG. 23 is a perspective cutaway view of a check valve according to the present invention that is rectangular in shape and which is installed in a concrete conduit.

As previously described, the check valve 10 of the present invention can have a circular shape. Alternatively, in some embodiments, the check valve 10 is a different shape including, but not limited to, a rectangular, square, oval, or elliptical shape. For example, FIG. 23 illustrates a rectangular shaped check valve 90 that is installed in a concrete conduit 92.

Whereas particular embodiments of this invention have been described above for purposes of illustration, it will be evident to those skilled in the art that numerous variations of the details of the present invention may be made without departing from the invention.

The invention claimed is:

1. A check valve comprising:
   (a) a tubular sleeve bounding a longitudinally-extending flow-through passage for fluids, said sleeve having an upstream fluid inlet end region and a downstream fluid outlet region, wherein the upstream fluid inlet end region and/or the downstream fluid outlet region is adapted to be affixed to a conduit;
   (b) the downstream fluid outlet region of said sleeve being integrally formed with a longitudinally-extending trough, said trough having a bottom wall and a pair of side walls integral with said bottom wall, said trough formed with said downstream fluid outlet region of said sleeve so as to provide a flow-through passage for said fluids;
   (c) a disc comprising a first material affixed along a first portion of its periphery to a flexible hinge member, said flexible hinge member affixed to and interposed between said disc and said downstream fluid outlet region of said sleeve, said flexible hinge member comprising a second material which is more flexible than the first material of said disc, and wherein a second portion of the periphery of said disc opposite said first portion rests within said trough on said bottom wall of said trough when said valve is in a closed position, wherein said disc opens said valve in response to positive differential pressure within said valve;
   (d) a bill affixed at a first end to one or more of the group consisting of the sleeve, the flexible hinge member, and the disc, said bill extending longitudinally downstream along said longitudinal axis of said trough, said bill being integrally formed with said side walls of said trough, said bill being formed of a flexible material and forming an opening for discharge of fluid in response to a positive differential pressure within said valve from said fluid, and said bill forming a seal to prevent backflow of said fluid through said valve when no differential pressure or negative differential pressure is present; and
   (e) at least one:
      (i) groove comprising a depression formed through a surface of the disc, wherein the at least one groove extends longitudinally along a length of the disc between a top end and bottom end of the disc and wherein the groove exists at least when the check valve is in a fully closed position; and/or
      (ii) notch comprising an indentation formed through a contiguous material of a surface of the bill at an end where the bill opens and closes to discharge the fluid and wherein the notch exists at least when the check valve is in a fully closed position.

2. The check valve of claim 1, wherein the at least one groove extends continuously along the length of the disc.

3. The check valve of claim 1, wherein the at least one groove extends intermittently along the length of the disc.

4. The check valve of claim 1, wherein the at least one groove extends along the length of the disc at an angle.

5. The check valve of claim 1, wherein the at least one groove is tapered.

6. The check valve of claim 1, wherein the check valve comprises two or more grooves and wherein at least two of the grooves are interconnected.

7. The check valve of claim 6, wherein the at least two interconnected grooves extend along the length of the disc at different angles.

8. The check valve of claim 1, wherein the at least one groove is formed along at least a downstream side of the disc.

9. The check valve of claim 1, wherein the at least one groove is formed along at least an upstream side of the disc.

10. The check valve of claim 1, wherein the at least one groove is round shaped, trapezoidal shaped, rectangular and/or square shaped, V shaped grooves, or combinations thereof.

11. The check valve of claim 1, wherein the check valve comprises the at least one notch.

12. The check valve of claim 1, wherein the at least one notch forms a curved indentation at the end of the bill.

13. The check valve of claim 1, wherein the check valve comprises both the at least one groove and the at least one notch.

14. The check valve of claim 1, wherein the check valve has a shape selected from rectangular, elliptical, oval, and hexagonal.

15. The check valve of claim 1, wherein the disc has a width that is coextensive with said pair of side walls of said trough, said disc forming a seal with said side walls when said valve is in a closed position.

16. The check valve of claim 1, wherein said sleeve, said trough, said flexible hinge member, said disc and said bill are each formed of one or more plies of an elastomeric material.

17. A check valve assembly comprising:
   (a) a check valve according to claim 1; and
   (b) a tubular body,
   wherein the check valve is integrally formed within the tubular body.

18. The assembly of claim 17, wherein a downstream region of the tubular body is affixed to an interior portion of a conduit.

19. The assembly of claim 17, wherein an entire lower portion of the check valve below a plane of a horizontal centerline of the check valve is vulcanized to the tubular body.

20. The assembly of claim 19, wherein portions of the check valve above the plane of the horizontal centerline of the valve that are in contact with the tubular body when the check valve is fully closed are vulcanized to the tubular body.

21. The assembly of claim 20, wherein the bill and disc of the check valve are separated from the interior portions of the tubular body.

* * * * *